Jan. 16, 1951     A. PATERSON     2,538,533
GLASS FORMING MACHINE
Filed March 27, 1948     5 Sheets-Sheet 1
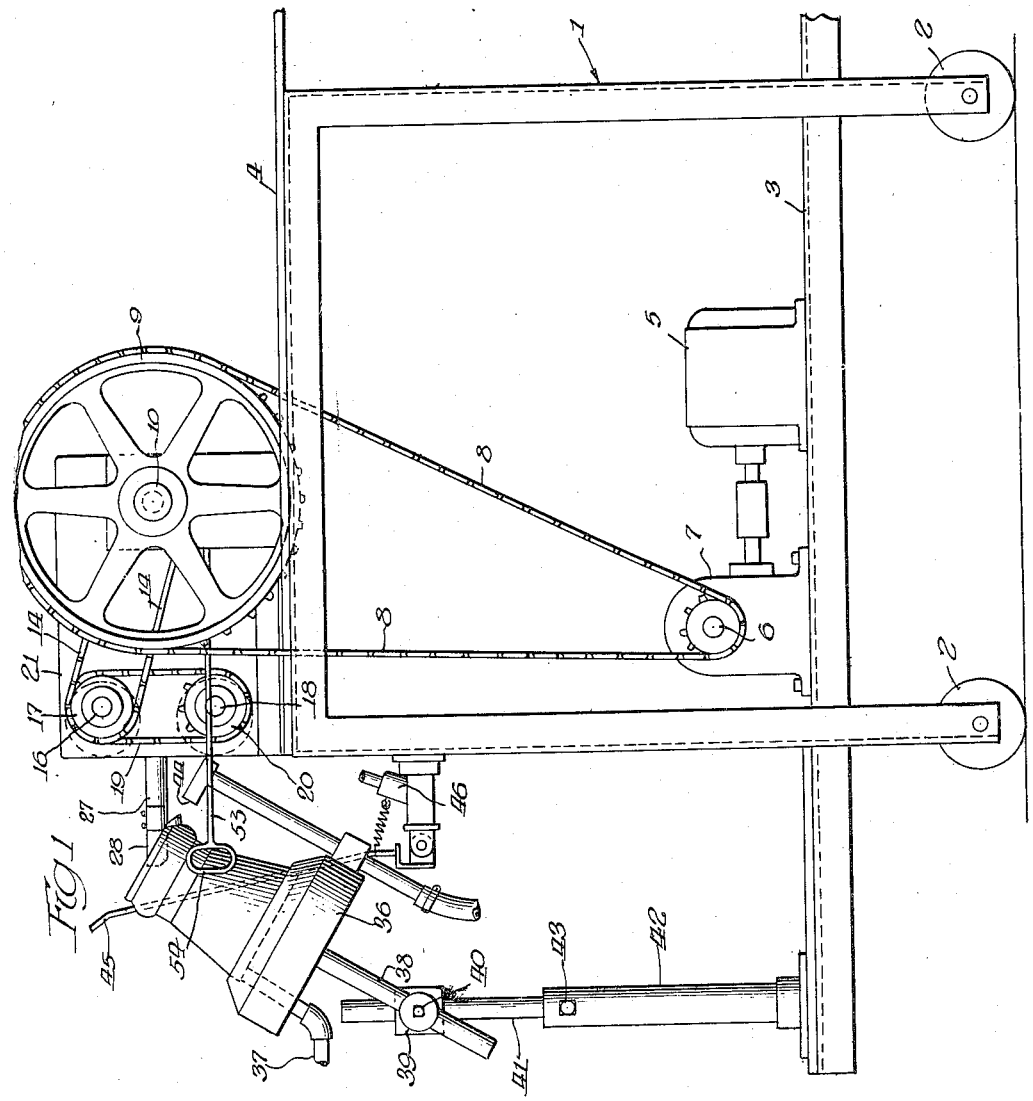
Inventor
Andrew Paterson
By: Spencer, Marzall, Johnston & Cook,
Attys Jan. 16, 1951  A. PATERSON  2,538,533
GLASS FORMING MACHINE
Filed March 27, 1948  5 Sheets-Sheet 3
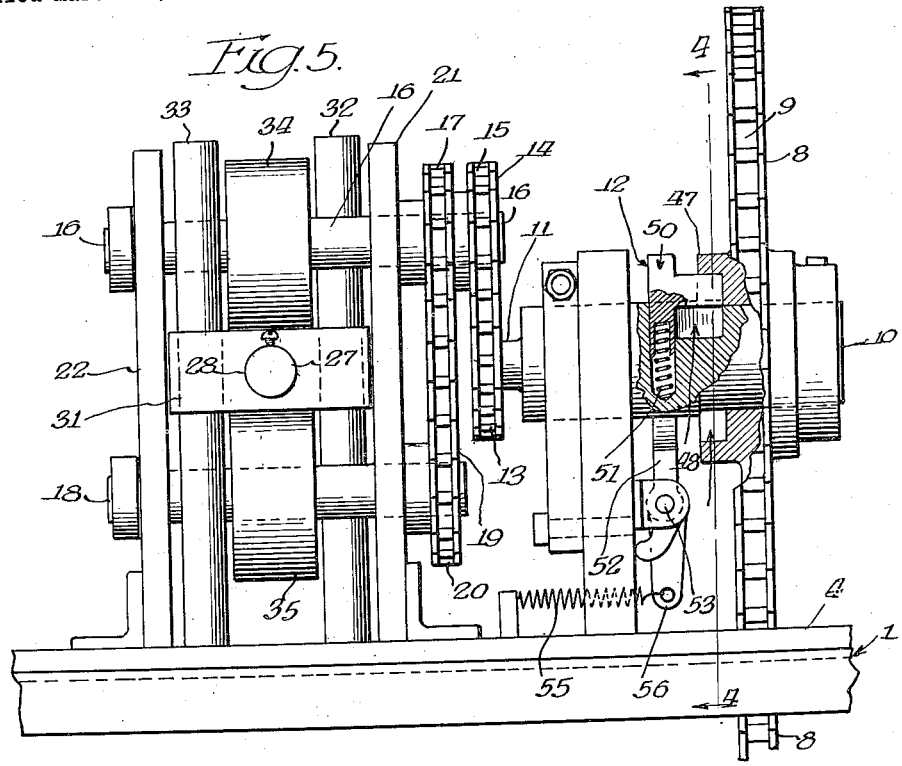
Inventor
Andrew Paterson
By; Spencer, Marzall, Johnston & Cook,
Attys

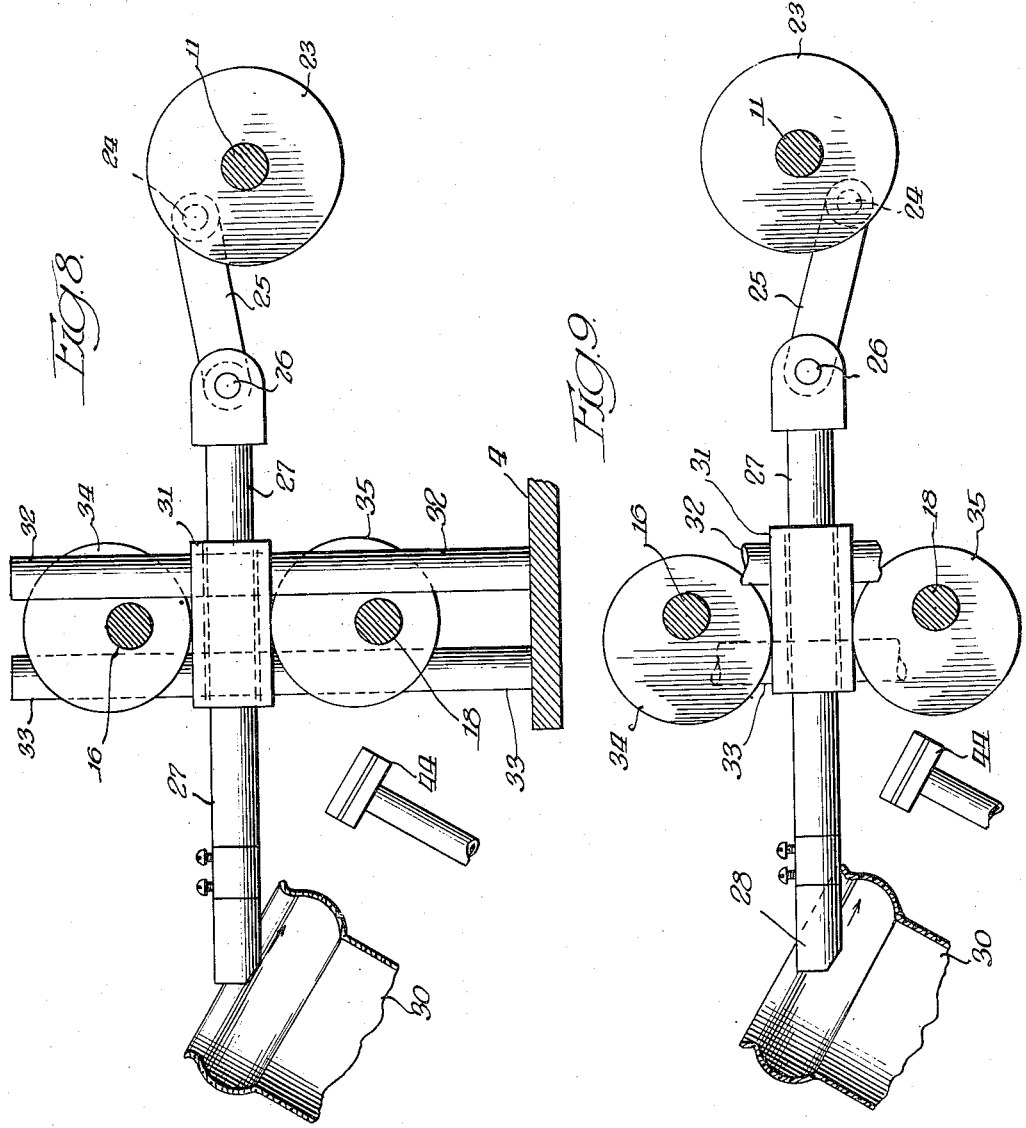

Jan. 16, 1951  A. PATERSON  2,538,533
GLASS FORMING MACHINE
Filed March 27, 1948  5 Sheets—Sheet 5
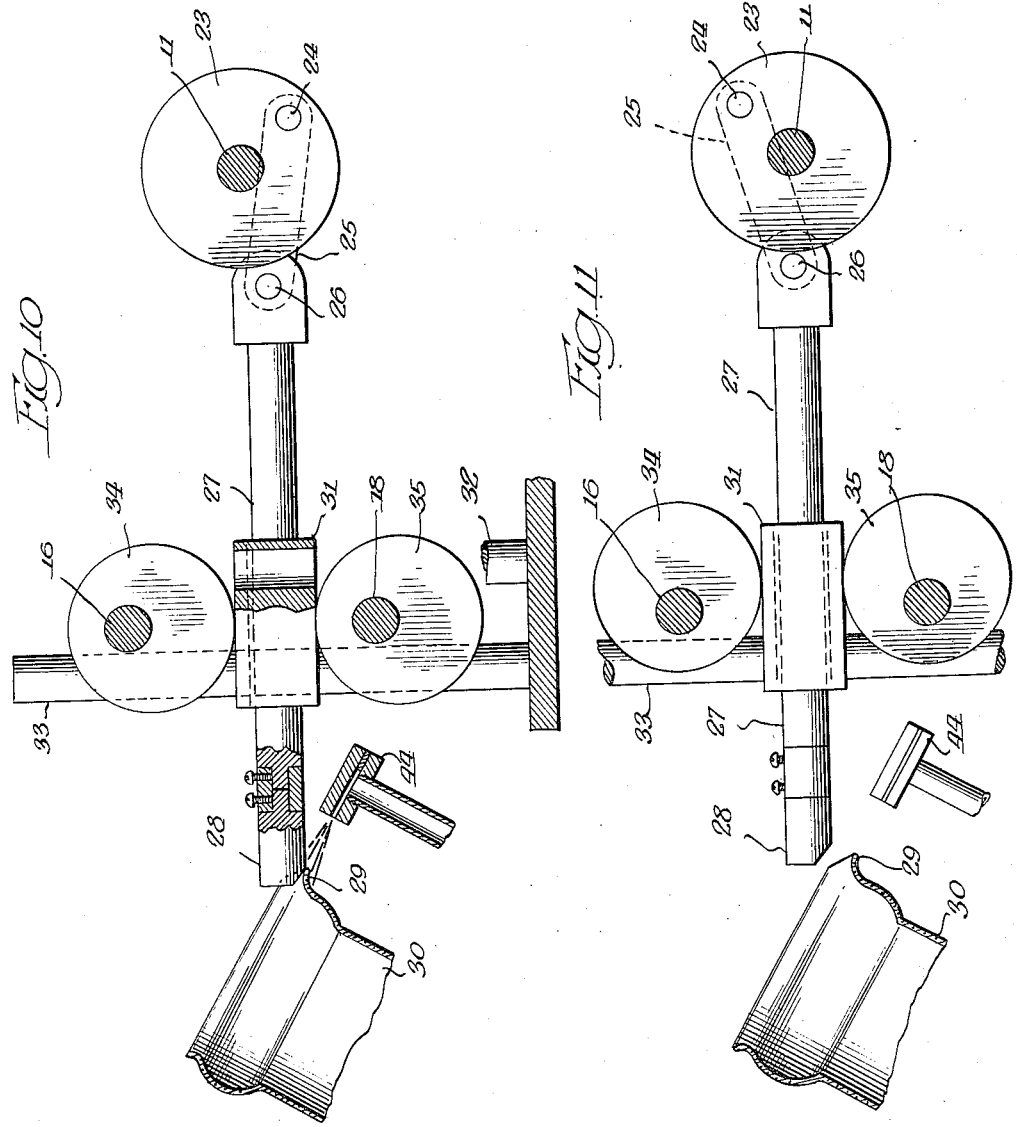
Inventor
Andrew Paterson
By; Spencer, Margall, Johnston + Cook,
Attys Patented Jan. 16, 1951

2,538,533

UNITED STATES PATENT OFFICE 2,538,533

GLASS FORMING MACHINE

Andrew Paterson, Chicago, Ill., assignor to Chamberlain, Inc., Chicago, Ill., a corporation of Illinois Application March 27, 1948, Serial No. 17,477

10 Claims. (Cl. 49—7)

This invention relates to a machine for use in forming glass vessels, receptacles or containers.

An important object of the present invention is the provision of a machine which has a rod for causing a wiping pressure on the molten rim of a glass receptacle to form a lip or pouring spout thereon whereby every receptacle will be subjected to the same operation making every lip or spout the same in size, shape and contour.

Another important object of the present invention is the provision of a lipping machine for forming a pouring lip or spout on glass receptacles, the machine having a rod which is adapted to be operated in an orbital path to provide a downward pressing wiping action against the molten rim of a container.

Still another important object of the invention is the provision of a lipping machine having mechanism operable in an orbital path to effect a downward pressing and outward wiping operation against a molten edge of a glass vessel, the machine being adapted to effect one continuous operation to complete a cycle, and then automatically come to rest upon the completion of said cycle.

A still further object of the invention is the provision of a lipping machine having a base for supporting a vessel thereon by suction, and manually controlled gas means to fire the container to a predetermined heat, there being a manually operated handle which may be turned to cause the machine to go through one single cycle to bring a lipping rod into pressing and wiping engagement with the heated container to form a lip thereon.

Numerous other objects and advantages will be apparent throughout the progress of the specification which follows.

The accompanying drawings illustrate a selected embodiment of the invention, and the views therein are as follows:

Fig. 1 is a detail side elevation of a lipping machine embodying the invention;

Fig. 2 is a detail perspective view of the container supporting base;

Fig. 5 is a detail front elevational view;

Fig. 6 is a detail perspective view of the container;

Fig. 7 is a detail sectional view on the lines 7—7 of Fig. 6; and

Figure 3:
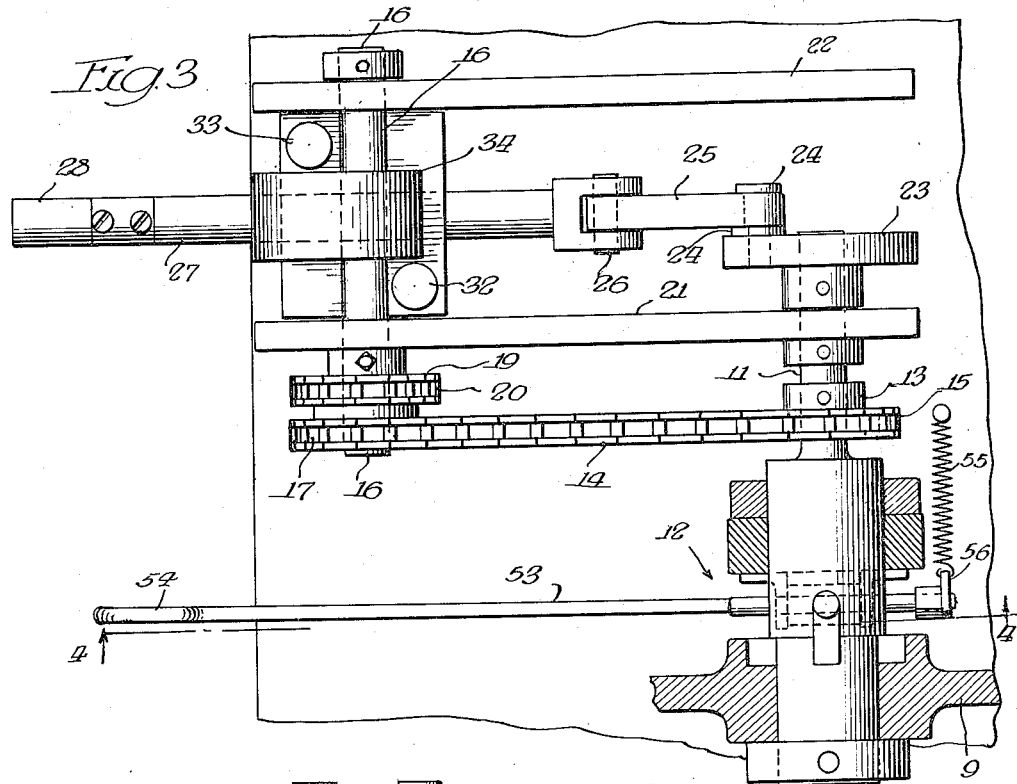
Fig. 3 is a detail top plan view.

Figs. 8 to 11, inclusive, are diagrammatical views showing the manner in which the lipping rod moves through its orbital path to perform the lipping operation.

The particular device herein shown for the purpose of illustrating the invention comprises a supporting structure 1 which may be mounted on wheels 2 to permit the machine to be moved from one location to another. The structure 1 has a lower shelf 3 and a top 4. The shelf 3, Fig. 1, supports a motor 5 which drives a sprocket 6 through reduction gearing in the gearing case 7. A sprocket chain 8, driven by the sprocket 7, drives a driven sprocket 9 which is mounted on a shaft 10. The shaft 10 is mounted rotatively in suitable bearings carried by the structure top 4. The shaft 10 is adapted to drive a shaft 11 which is in alignment with the shaft 10, the shaft 11 being driven by the shaft 10 through clutch mechanism 12. The shaft 10 is adapted to be rotated continuously while the shaft 11 is adapted to be driven intermittently through the clutch 12, although the shaft 11 may be driven continuously should the occasion arise.

The shaft 11 carries a sprocket 13 which drives a sprocket chain 14 trained over a sprocket 15 fixed to a transverse shaft 16. The shaft 16 also has a second sprocket 17 fixed thereto and drives a second shaft 18 by means of a sprocket chain 19 trained over the sprocket 17 and a sprocket 20 which is fixed to the shaft 18. The shafts 16 and 18 are suitably and properly journaled rotatively in spaced brackets 21 and 22 which are secured to the top 4.

A member 23 which acts as a crank is attached to the shaft 11. A pin 24 is secured to a face of the member 23 and drives a link or arm 25 which is pivotally mounted on the pin 24. The link or arm 25 is pivotally connected at 26 to one end of a bar or rod 27, the outer end 28 of said rod performing the lipping operation to form a lip 29 on a glass container 30, Figs. 6 to 11. The bar or rod 27 has horizontal slidable or reciprocating movement in a guide sleeve 31 which is guided for vertical movement on spaced guide rods 32 and 33, vertical holes being provided in the guide sleeve or block 31 to receive slidingly said rods 32 and 33. The rotation of the shaft 11 causes horizontal reciprocation of the bar or rod 27 by reason of the connections and parts 23 to 26. The rod 27 also is adapted to have vertical, or up-and-down, movement so that the lipping end 28 of the bar or rod 27 will move in an orbital path in a vertical plane.

The end 28 of rod 27 is given vertical movement by means of opposed guide wheels 34 and 35 which are eccentrically mounted on the shafts 16 and 18, respectively. The wheels 34 and 35 act as cams, and their peripheries have rolling contact with the guide block 31, whereby the bar or rod 27 will be raised and lowered upon rotation of the shafts 16 and 18. The wheels or cams 34 and 35 are positioned eccentrically in such a manner that there will always be the same distance between the adjacent peripheries thereof. The end 28 of the rod or bar 27 is thus given vertical movement as well as horizontal movement, therefore, the lipping end 28 is movable in an orbital path in a vertical plane. The bar or rod 27, in rest or normal inoperative position, is retracted inwardly and at its highest elevation. The rod 27 then moves outwardly to its full extent and projects into the opening of the glass receptacle 30 as shown in Fig. 8. The movements of the bar which follow are downwardly and inwardly so that there will be a downward pressure of the lipping end against the rim of the receptacle, as well as wiping action, so that the end 28 will form the molten glass progressively, Figs. 8 to 11, to form the lip 29, Figs. 6, 7 and 11. The rod or bar assumes its rest or inoperative position after the completion of the lip forming operation and after the rod has been fully retracted inwardly.

The receptacle or container 30, to which the lip 29 is to be formed, is mounted on an adjustable base 36 and is held to the base by means of suction, there being an opening in the bottom of the base to which a suction line 37 is connected, and which suction line leads to a source of suction, Figs. 1 and 2. The base 36 has a rigid rod 38 connected thereto which has slidable movement in a block 39 and is, therefore, given vertical adjustment. The rod 38 may be locked in any adjustable position by means of a set screw 40. The rod or bar 38 has pivotal movement in the supporting block 39, whereupon the base 36 may be shifted in an arc throughout various angles, as well as being moved inwardly and outwardly. Further vertical adjustable movement of the base is given by means of a rod or bar 41 to which the block 39 is attached. The rod 41 has telescoping movement in a tubular base part 42. The vertical movement of the rod 41 with respect to the tubular base part 42 provides for considerable vertical adjustment, and the parts may be locked in adjusted position by means of tightening a set screw 43. The container or receptacle 30, therefore, is positioned at the proper height and at the proper angle with respect to the lipping end 28 so that various size lips may be formed and various sizes of receptacles or containers may be accommodated.

The receptacle is mounted on the supporting base 36 while it is still hot from the forming thereof and is maintained in rigid position thereon by means of suction. The part of the container, where the lip 29 is to be formed, is again heated by means of a gas jet 44, which is manually controlled by a handle 45 to operate the gas valve 46. The burner 44 is connected to ordinary gas, there being a shut-off valve in the gas line. However, for the heating operation, acetylene gas is mixed with the ordinary gas, and the amount of the acetylene gas is determined by the position of the valve 46. The valve is adjusted so that when the operating handle 45 is operated, the proper gas flame will come from the burner or jet 44.

Figure 4:
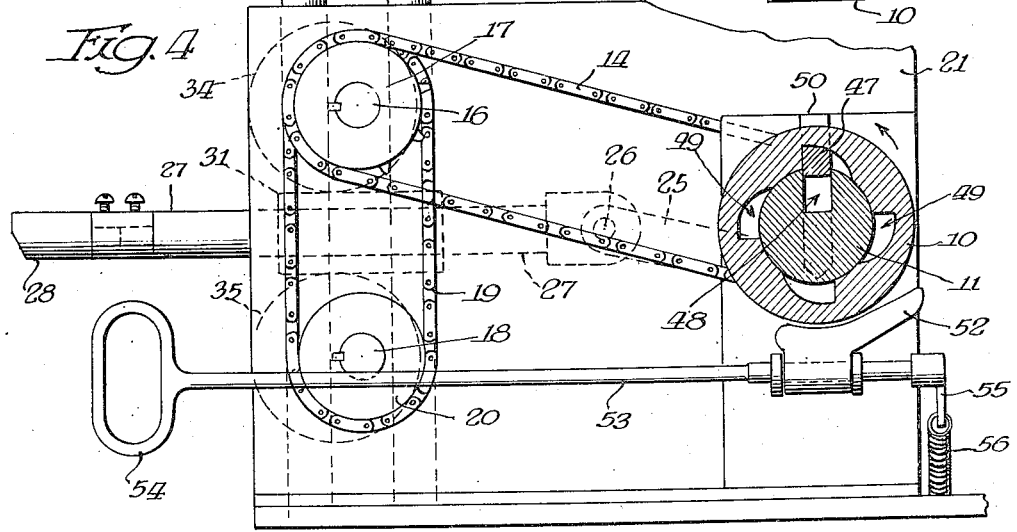
Fig. 4 is a detail vertical sectional view on the lines 4—4 of Figs. 3 and 5.

The machine is so constructed and arranged that one complete cycle of operation will be performed for forming the lipping operation even though the shaft 10 continues to run continuously. The shaft 11, the rod 27 and the wheels 34 and 35 are caused to operate through one cycle of the operation and normally are at rest even though the shaft 10 continues to rotate. The operation of the shaft 11, and consequently the other parts controlled thereby, is brought about by means of the clutch 12. The clutch 12 comprises a bar in the shaft 10 and a plunger 47 which is adapted to operate in a slot 48 formed in the shaft 10 and with recesses or cutaways 49 formed internally about the periphery. The plunger 47, Fig. 4, includes an extension or operating piece 50, Fig. 5, which extends outwardly and is normally pressed outwardly by a spring 51 so as to normally cause the plunger 47 to be pressed outwardly and be received in a recess 49 and, therefore, cause locking engagement between the shafts 10 and 11. A control finger 52 mounted on a rod 53 is adapted to engage the extension 50 while the shaft 10 is rotating, and, therefore, move the plunger 47 into the slot 48 and out of engagement with the walls of the shaft 10 at the recess or cutaway 49. As soon as the projection 50 of the clutch strikes the finger 52, the shaft 11 will be disconnected from the shaft 10, whereby the shaft 10 may continue to rotate but the shaft 11 will remain stationary. To cause operation of the shaft 11 by connecting it with the shaft 10, a handle 54 on the rod 53 is given a part turn so as to remove the finger 52 out of the path of the member 50. As soon as the finger 52 is no longer in engagement with the extension 50, the spring 51 will move the plunger 47 upwardly into the engagement shown in Fig. 4, whereupon the parts will again be connected. The handle 54 is operated against the tension of a spring 55 connected to an arm 56 on the end of the rod. The rod 53 is operated manually by turning the handle, and when released, the finger 52 will be pulled by the spring 55 to return the finger 52 into position to again engage the projection 50. However, as soon as one rotation is had, the projection 51 will again strike the finger 52 and cause the parts to become disconnected again, and the shaft 11 and all the parts operated thereby will remain at rest. The parts will continue to be at rest until the handle 54 is again operated to shift the finger 52 out of position to cause engagement of the clutch. The lipping rod or part of the finger therefore will operate during one complete cycle, and, therefore, the attendants may remove the lipped container and insert another in position without hindrance of any moving parts. The clutch is so constructed and arranged that the parts will be in their disconnected position when the rod or arm 27 is at its extreme upward and inward position. When the handle 54 is operated, the rod or bar 27 will move inwardly and downwardly to perform the lip forming operation, and after the lip forming operation, the parts controlling the operation of the rod 27 will cease functioning and be at rest.

*Operation*

The operator first arranges the base 36 in adjusted position and mounts a receptacle thereon, the receptacle being rigidly held on the base by means of suction coming through the line 37. The handle 45 is then operated to produce the proper gas flame to preheat the rim of the receptacle at the point where the lip 29 is to be formed. As soon as the edge has received the proper amount of heat, the operator shifts the handle 54 which will move away from the projection 50, whereupon the rod 27 will go through one cycle of operation. The operator merely turns the handle 54 until the parts are engaged, and then immediately releases the handle, whereupon one complete operation is performed and the parts for operating the rod 27 will come to rest at the conclusion of one cycle.

The invention provides a lipping machine which is ambulatory whereby it may be moved from position to position adjacent the glass forming machine. The machine is adapted to be adjusted at any proper height or angularity to accommodate vessels or receptacles of various types or kinds, as well as to form various size lips 29. The lipping is done in one complete operation by a machine that performs a single lipping operation and goes through the same lipping cycle upon the will of the operator. The lipping rod, going through the same operation and operating in the same orbital path at all times, causes every lip of the containers being run to be the same. The machine is adapted to be controlled by the operator and at such speed as suits the fancy and whim of the operator. The parts are so constructed and synchronized that the proper amount of wiping pressure to the lipping end will occur through a proper time interval so as to provide the proper kind and shape of lip desired or required. The machine is relatively simple in construction, may be readily and economically manufactured, and is not likely to get out of order. The slide supporting bearing 31 may be substituted by another so that various size rods 27 may be accommodated. Also, the bearings in which the shafts 16 and 18 are mounted or supported may be adjustable so as to accommodate bigger roller elements 34 and 35 to accommodate larger or smaller rods 27. In actual practice, however, it has been found that a single rod 27 may be employed for all purposes because the lipping end 28 is made detachable and, therefore, a lipping end 28 of the desired size may be substituted.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. A machine for forming a pouring lip or spout on a utensil comprising a supporting structure, a shaft mounted for rotation and supported by said structure, a second shaft normally inoperative, a clutch connecting said shafts to permit selective rotation of the second shaft by the first shaft, a lipping rod having a lipping end, means driven by the second shaft to operate the lipping rod, said means comprising a crank driven by the second shaft, and means connecting the crank to the rod.

2. A machine for forming a pouring lip or spout on a utensil comprising a supporting structure, a shaft mounted for rotation and supported by said structure, a second shaft normally inoperative, a clutch connecting said shafts to permit selective rotation of the second shaft by the first shaft, a lipping rod having a lipping end, means driven by the second shaft to operate the lipping rod, said means comprising a crank driven by the second shaft, a pair of eccentrically mounted spaced rollers, and a slide bearing between said rollers and slidingly receiving said rod.

3. A machine for forming a pouring lip or spout on a utensil comprising a supporting structure, a shaft mounted for rotation and supported by said structure, a second shaft normally inoperative, a clutch connecting said shafts to permit selective rotation of the second shaft by the first shaft, a lipping rod having a lipping end, and means driven by the second shaft to operate the lipping rod, said last named means including means to move the lipping end in an orbital path.

4. A machine for forming a pouring lip or spout on a utensil comprising a supporting structure, a shaft mounted for rotation and supported by said structure, a second shaft normally inoperative, a clutch connecting said shafts to permit selective rotation of the second shaft by the first shaft, a lipping rod having a lipping end, means driven by the second shaft to operate the lipping rod, said means comprising a crank driven by the second shaft, a pair of eccentrically mounted spaced rollers, a slide bearing between said rollers and slidingly receiving said rod, and means to rotate said rollers from said second shaft.

5. A machine for forming a pouring lip or spout on a utensil comprising a supporting structure, a shaft mounted for rotation and supported by said structure, a second shaft normally inoperative, a clutch connecting said shafts to permit selective rotation of the second shaft by the first shaft, a lipping rod having a lipping end, means driven by the second shaft to operate the lipping rod, said means comprising a crank driven by the second shaft, a pair of eccentrically mounted spaced rollers, a slide bearing between said rollers and slidingly receiving said rod, means to rotate said rollers from said second shaft, a support for holding a utensil thereon by suction, and means to adjust said support vertically and angularly.

6. A machine for forming a pouring lip or spout on a utensil comprising a supporting structure, a shaft mounted for rotation and supported by said structure, a second shaft normally inoperative, a clutch connecting said shafts to permit selective rotation of the second shaft by the first shaft, a lipping rod having a lipping end, means driven by the second shaft to operate the lipping rod, said means comprising a crank driven by the second shaft, a pair of eccentrically mounted spaced rollers, a slide bearing between said rollers and slidingly receiving said rod, means to rotate said rollers from said second shaft, a support for holding a utensil thereon by suction, means to adjust said support vertically and angularly, a gas jet connected to a source of supply adjacent said last named support, and valve means to control the flow of gas through the jet.

7. A machine for forming a pouring lip or spout on a utensil comprising a supporting structure, a shaft mounted for rotation and supported by said structure, a second shaft normally inoperative, a clutch connecting said shafts to permit selective rotation of the second shaft by the first shaft, a lipping rod having a lipping end, means driven by the second shaft to operate the lipping rod, said means comprising a crank driven by the second shaft, a pair of eccentrically mounted spaced rollers, a slide bearing between said rollers and slidingly receiving said rod, means to rotate said rollers from said second shaft, a support for holding a utensil thereon by suction, means to adjust said support vertically and angularly, a gas jet connected to a source of supply adjacent said last named support, valve means to control the flow of gas through the jet, a clutch rod normally arranged in position to permit operation of said clutch to operate the second shaft, and means to prevent operation of the clutch except upon operation of the clutch rod.

8. A machine for forming a pouring lip or spout on a utensil comprising a supporting structure, a shaft mounted for rotation and supported by said structure, a second shaft normally inoperative, a clutch connecting said shafts to permit selective rotation of the second shaft by the first shaft, a lipping rod having a lipping end, means driven by the second shaft to operate the lipping rod, said last named means including means to move the lipping end in an orbital path, and means to stop operation of the lipping rod after the lipping rod has completed one cycle of operation.

9. A machine for forming a pouring lip or spout on a utensil comprising a supporting structure, a shaft mounted for rotation and supported by said structure, a second shaft normally inoperative, a clutch connecting said shafts to permit selective rotation of the second shaft by the first shaft, a lipping rod having a lipping end, means driven by the second shaft to operate the lipping rod, said last named means including means to move the lipping end in an orbital path, and means to stop operation of the lipping rod after the lipping rod has completed one cycle of operation, said machine having wheels to permit the machine to be moved from one location to another.

10. A machine for forming a pouring lip or spout on a utensil comprising a supporting structure, a shaft mounted for rotation and supported by said structure, a second shaft normally inoperative, a clutch connecting said shafts to permit selective rotation of the second shaft by the first shaft, a lipping rod having a lipping end, means driven by the second shaft to operate the lipping rod, said means comprising a crank driven by the second shaft, a pair of eccentrically mounted spaced rollers, a slide bearing between said rollers and slidingly receiving said rod, means to rotate said rollers from said second shaft, a support for holding a utensil thereon by suction, means to adjust said support vertically and angularly, a gas jet connected to a source of supply adjacent said last named support, valve means to control the flow of gas through the jet, a clutch rod normally arranged in position to permit operation of said clutch to operate the second shaft, and means to prevent operation of the clutch except upon operation of the clutch rod, said machine having wheels to permit the machine to be moved from one location to another.

ANDREW PATERSON.

REFERENCES CITED

The following references are of record in the file of this patent:

UNITED STATES PATENTS

| Number | Name | Date |
|---|---|---|
| 193,317 | Buttlear | July 24, 1877 |
| 1,546,353 | Rippl et al. | July 14, 1925 |
| 1,578,427 | Gray et al. | Mar. 30, 1926 |
| 2,151,846 | Dichter | Mar. 28, 1939 |
| 2,366,609 | Gates | Jan. 2, 1945 |
| 2,377,534 | Wexell et al. | June 5, 1945 |